United States Patent
Archer et al.

(10) Patent No.: US 7,672,518 B2
(45) Date of Patent: *Mar. 2, 2010

(54) USE OF FREQUENCY TRANSFORM IN THE ANALYSIS OF IMAGE SENSORS

(75) Inventors: Greg L. Archer, Rochester, NY (US); Eric J. Meisenzahl, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 1373 days.

This patent is subject to a terminal disclaimer.

(21) Appl. No.: 11/092,300

(22) Filed: Mar. 29, 2005

(65) Prior Publication Data
US 2006/0228042 A1 Oct. 12, 2006

(51) Int. Cl.
G06K 9/46 (2006.01)
(52) U.S. Cl. ...................................... 382/232
(58) Field of Classification Search ................. 382/232, 382/239
See application file for complete search history.

(56) References Cited

U.S. PATENT DOCUMENTS

| | | | |
|---|---|---|---|
| 4,979,038 A * | 12/1990 | Guichard et al. | 375/240.18 |
| 5,086,488 A * | 2/1992 | Kato et al. | 382/239 |
| 5,121,216 A * | 6/1992 | Chen et al. | 382/239 |
| 5,173,788 A * | 12/1992 | Ohta | 382/264 |
| 5,710,835 A * | 1/1998 | Bradley | 382/233 |
| 5,903,678 A * | 5/1999 | Ibenthal | 382/249 |
| 6,647,132 B1 * | 11/2003 | Montillo et al. | 382/108 |
| 7,065,498 B1 * | 6/2006 | Thomas et al. | 705/26 |
| 2002/0181791 A1 * | 12/2002 | Kuniba | 382/239 |
| 2003/0123584 A1 * | 7/2003 | Siegel et al. | 375/350 |
| 2005/0008245 A1 * | 1/2005 | Katougi et al. | 382/254 |
| 2005/0220364 A1 * | 10/2005 | Lee | 382/300 |
| 2005/0249293 A1 * | 11/2005 | Zeng et al. | 375/240.29 |

* cited by examiner

Primary Examiner—Samir A. Ahmed
Assistant Examiner—Jayesh Patel
(74) Attorney, Agent, or Firm—Peyton C. Watkins; Nancy R. Simon

(57) ABSTRACT

A method for detecting and removing noise from an image, the method includes the steps of applying a frequency transform to the image for obtaining a magnitude image; comparing a threshold value to values of the magnitude image for obtaining thresholded values; setting one or more thresholded values to a predetermined value; and reconstructing the image from the magnitude image having the predetermined values for removing noise from the image.

7 Claims, 3 Drawing Sheets

USE OF FREQUENCY TRANSFORM IN THE ANALYSIS OF IMAGE SENSORS

FIELD OF THE INVENTION

The invention relates generally to the field of detecting and removing periodic noise from images and the like. More specifically, the invention relates to applying a frequency transform, such as a Fourier transform, to an image for locating undesirable noise in the image which may be quantified and removed. The present invention also includes an improved method of detecting streaks in images, especially flat-field images or images having known transform characteristics.

BACKGROUND OF THE INVENTION

Current test procedures to identify and measure streaking use an edge detection algorithm in the spatial domain to identify discontinuities in the image data and measure the change in intensity taking place over a number of pixels. A specific kernel is used to calculate gradient magnitudes at each pixel location. Based on allowed pixel deviation, the pixel locations of high gradient magnitudes are marked. A defect density test then measures localized densities of marked pixels.

A threshold is applied to determine if the gradient magnitude suggests a streak might exist. This presents a challenge when attempting to optimize test conditions for varying amounts of streaking. The lower the threshold, the more pixels will be detected, and the results become increasingly susceptible to noise, while a higher threshold may miss subtle pixels which constitute a streak. The defect density test is sensitive to the region of interest and would also be difficult to choose criteria that would be optimum for most devices. This method also allows the possibilities of false failure due to lens roll-off or edge effects. While this technique may be adequate for detecting most edges, it may not provide an accurate measurement regarding the severity of the streaking. Additionally, this method does not contain any directional information of the streak.

SUMMARY OF THE INVENTION

The present invention is directed to overcoming one or more of the problems set forth above. Briefly summarized, according to one aspect of the present invention, the invention resides in a method for detecting and removing noise from an image, the method comprising the steps of (a) applying a frequency transform to the image for obtaining a magnitude image; (b) comparing a threshold value to values of the magnitude image for obtaining thresholded values; (c) setting one or more thresholded values to a predetermined value; and (d) reconstructing the image from the magnitude image having the predetermined values for removing noise from the image.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the following advantage of applying a frequency transform for noise detection for improved noise detection.

DETAILED DESCRIPTION OF THE INVENTION

In the following description, the present invention will be described in the preferred embodiment as a software program. Those skilled in the art will readily recognize that the equivalent of such software may also be constructed in hardware.

It is also noted that the present invention may be used for image evaluation, image sensor testing, and image manipulation.

Figure 1:
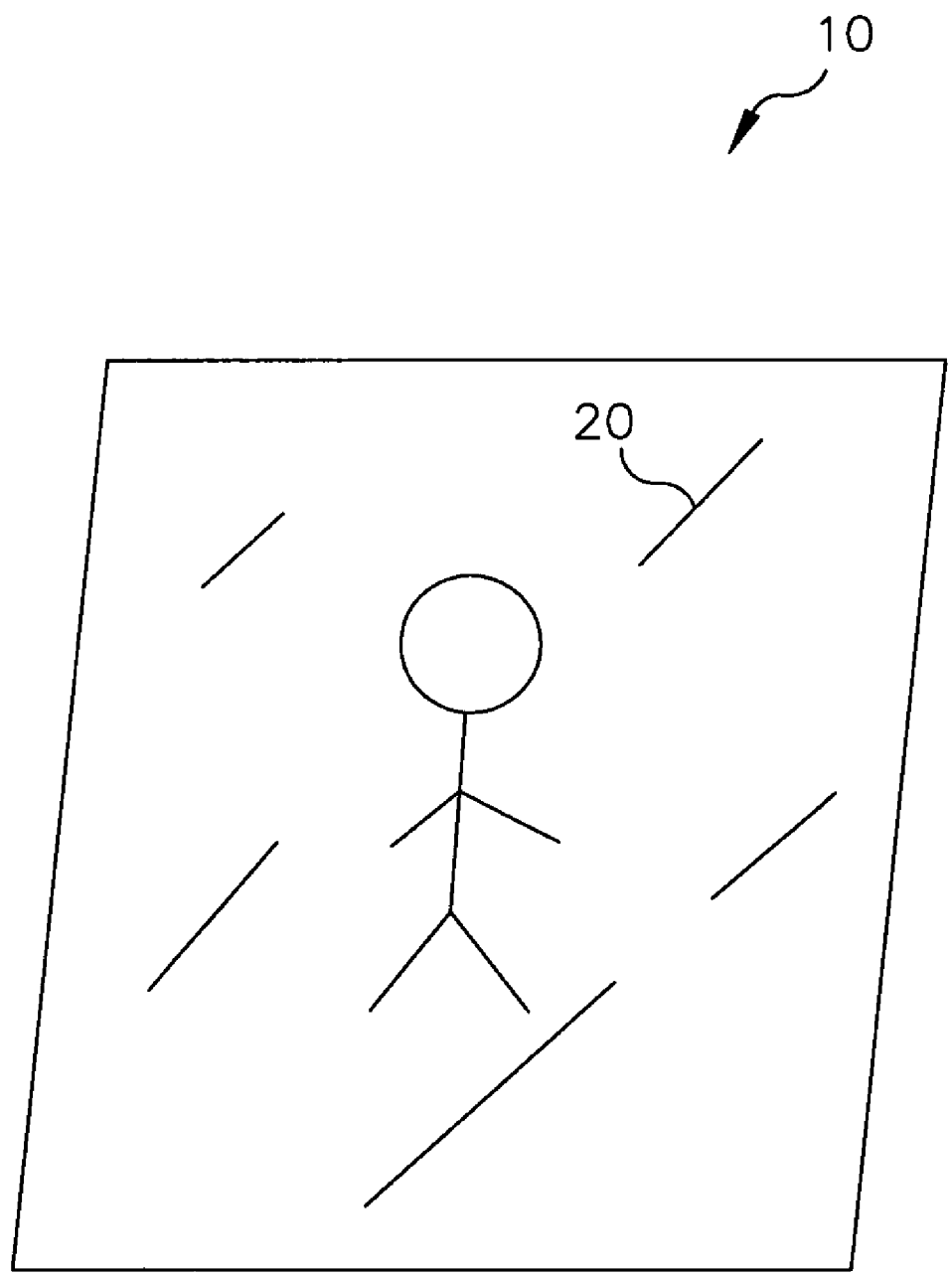
FIG. 1 is a typical image containing noise.

Referring to FIG. 1, there is shown a typical image 10 having noise 20 therein. The noise 20 may be perceptible to the human eye or substantially non-perceptible to the human eye in which case of non-perceptibility the image will appear grainy or the like. The present invention detects and removes periodic noise from the image as described herein below.

Figure 2:
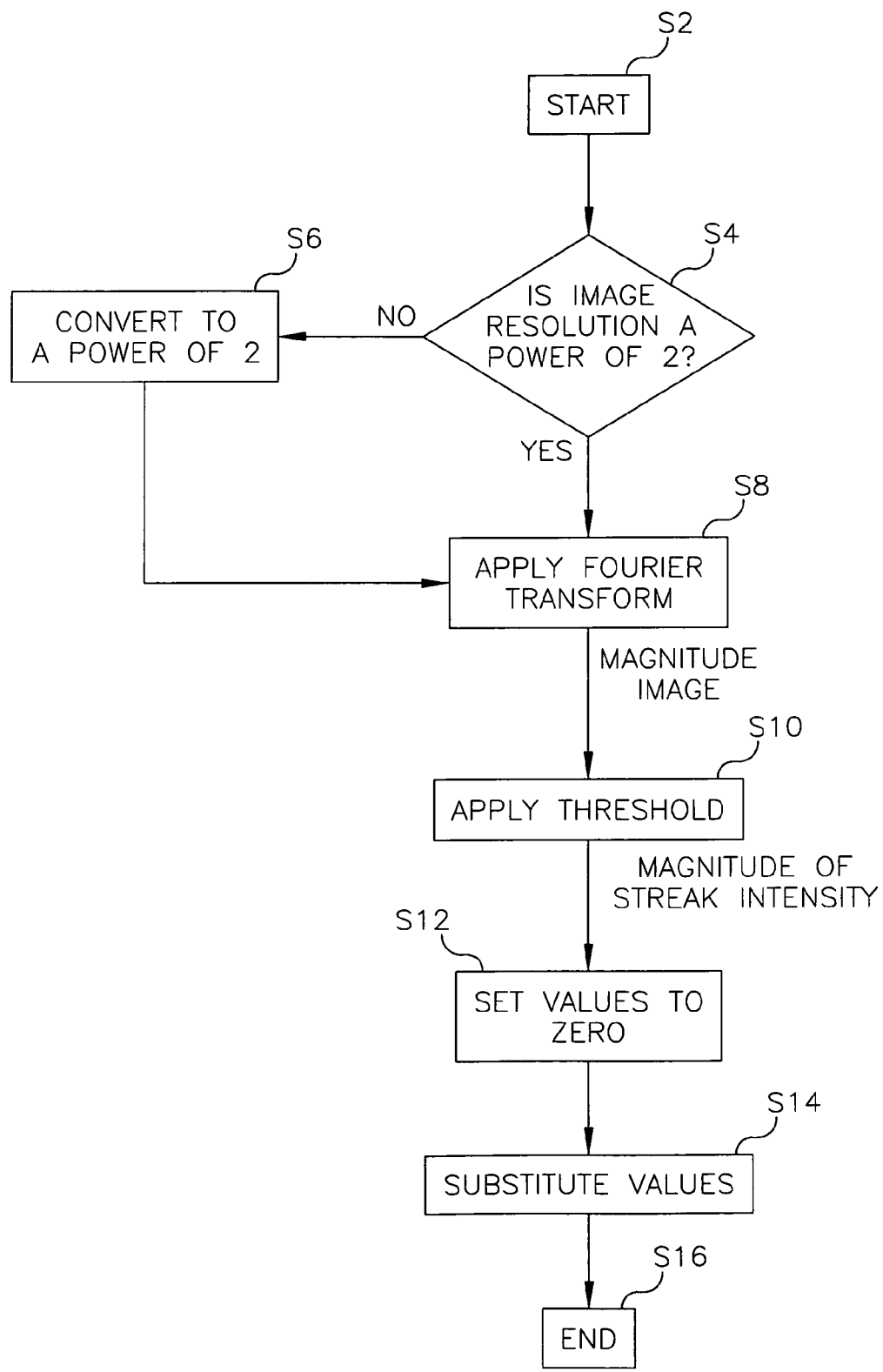
FIG. 2 is a flowchart of the software program of the present invention.

It is noted that the image may already be in digital format or, if it is not, the image is converted to digital format. Referring now to FIG. 2, there is shown a flowchart of a software program of the present invention. In this regard, the program is started S2 and the resolution of the digital image is obtained for determining S4 whether the image size or resolution is a power of two. If it is not a power of two, the digital image is preferably expanded S6 in the desired direction or directions for putting the image size or resolution to a power of two. The added pixel values may be all zero, which is generally referred to as zero padding, or average values in a neighborhood of an added pixel may be used as the value for the added pixel.

A Fourier transform is preferably applied S8 to each row and then applied again vertically to each column. It is noted that Fourier transform is the preferred embodiment, but other transform methods may also be used. The two transforms together result in a magnitude image or plot. Typically Fourier transforms that may be used are, but not limited to, fast Fourier transform (FFT) by Cooley and Tukey and discrete fast Fourier transforms by Danielson-Lanczos. It is noted that intensity in the magnitude image is substantially perpendicular or perpendicular to the noise in the original image. One or more threshold values are compared S10 to each pixel value in the magnitude image and pixels above or both at and above the threshold are designated thresholded values in the magnitude image. These thresholded values represent undesired or unwanted spacial frequencies identified as degrading image quality in the original image. Alternatively, pixels in a particular x-y area or region may be summed and a threshold value is then applied to the summed values and pixels above or both at and above the threshold are designated high-energy pixels. The result is magnitudes of streak intensity.

Figure 3:
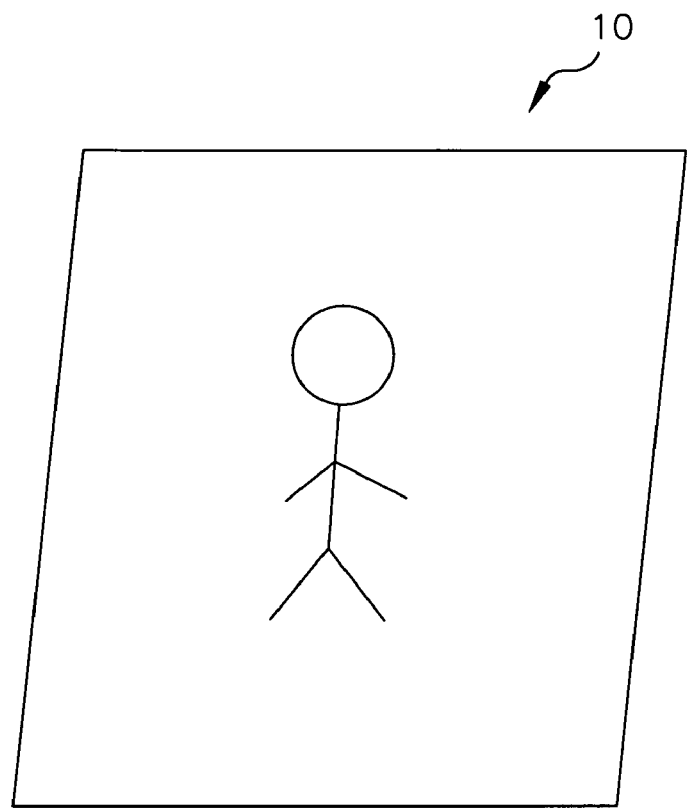
FIG. 3 is a typical image having the noise removed after applying the noise detection of the present invention.

The values meeting the threshold criteria are preferably set S12 to zero or alternatively to substantially zero. These values are substituted S14 for the values in the magnitude image and the new values are used when reverse transforming back to an original spatial image with the noise removed, and the program is ended S16. The image 10 with the noise 20 removed is illustrated in FIG. 3.

It is instructive to note that the noise detected and/or removed may be, but not limited to, any fixed cosmetic artifact provided by the image sensor such as grouping of defects in a column, row, or cluster of pixels. Furthermore, a cluster defect represents a grouping of two or more defective pixels in any contiguous pattern. Other artifacts consist of image streaks or shading or any other fixed background pattern.

Figure 4:
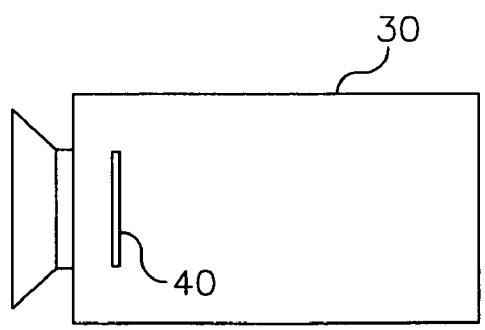
FIG. 4 is a digital camera for illustrating a typical commercial embodiment for which the present invention is used.

Referring to FIG. 4, there is shown a digital camera 30 having the software program 40 of the present invention installed therein for detecting and removing noise after image capture.

The invention has been described with reference to a preferred embodiment. However, it will be appreciated that variations and modifications can be effected by a person of ordinary skill in the art without departing from the scope of the invention.

PARTS LIST

10 Image
20 Noise
30 Digital Camera
40 Software Program

The invention claimed is:

1. A method for detecting and removing noise from an image captured by an image sensor, the method comprising:
   (a) determining whether a resolution of the image is a power of two, and if the resolution is not a power of two, adding pixel values to the image in at least one direction to obtain a resolution that is a power of two;
   (b) applying a frequency transform to the image for obtaining a magnitude image;
   (c) comparing a threshold value to at least a portion of the pixel values in the magnitude image for obtaining one or more thresholded values, wherein each thresholded value comprises a pixel value that either meets or exceeds the threshold value;
   (d) setting the one or more thresholded values to a predetermined value to substitute the predetermined value for each thresholded value in the magnitude image; and
   (e) reconstructing the image from the magnitude image comprised of unchanged pixel values and the one or more substituted predetermined values for removing noise from the image.

2. The method as in claim 1, wherein (d) includes setting the one or more thresholded values to zero.

3. The method as in claim 1, wherein (d) includes setting the one or more thresholded values to substantially zero.

4. The method as in claim 1 further comprising locating pixel values at substantially each pixel in the magnitude image before comparing to the threshold value.

5. The method as in claim 1 further comprising
   locating pixel values of a predetermined area in the magnitude image; and
   summing or averaging the pixel values in the predetermined area before comparing to the threshold value.

6. The method as in claim 1, wherein (b) comprises applying a Fourier transform as the frequency transform.

7. The method of claim 1, wherein (b) comprises applying a frequency transform to each row of pixel values in the image and applying a second time the frequency transform to each column of pixel values in the image.

* * * * *